Patented Dec. 5, 1939

2,182,714

UNITED STATES PATENT OFFICE 2,182,714

PIPE LINING CEMENT

Joshua Chitwood Witt, Chicago, Ill.

No Drawing. Application April 24, 1937,
Serial No. 138,861

2 Claims. (Cl. 106—24)

The invention relates to pipe lining cement and to a process of producing a cement of this type. More particularly the invention relates to the production of a low soluble pipe lining cement from a special Portland cement clinker.

The desirable characteristics of pipe lining cements, although not in order of their importance, are strength, plasticity, low solubility and resistance to substances that may be present in natural waters such as sulphates. The above characteristics are functions of the chemical and physical characteristics of the clinker and the slag employed in the manufacture of pipe lining cements. This type of cement, as heretofore produced, has required a relatively large percentage of cement clinker in order to insure proper strength in the resulting product, which adversely affects the low solubility desired. Cement clinker is partly soluble in water, whereas blast furnace slag is practically insoluble and thus, other factors being equal, the higher the percentage of slag, the lower the solubility of the final cement.

Therefore an object of the invention is to provide a pipe lining cement wherein a high percentage of slag, such as blast furnace slag, may be used to insure low solubility.

Another object of the invention is to produce a cement for lining pipes and the like which will be characterized by low solubility and adequate strength for all requirements of service.

A further object of the invention is to produce a pipe lining cement which will possess the unusual combination of improved quality and low production cost.

Pipe lining cements have heretofore been made by compounding therewith materials readily attainable and having established well known uses. The present invention aims to produce an improved cement for like purposes by mixing blast furnace slag with a special Portland cement clinker having certain desired characteristics. More particularly, the present cement is produced by compounding blast furnace slag and special Portland cement clinker in proper proportions with sufficient gypsum for controlling the set of the final product. The slag, special cement clinker and gypsum are then ground together to approximately 200 mesh fineness.

The special clinker was chosen from approximately ninety experimental burns primarily on the basis of its low solubility in water. An analysis of the special clinker in comparison with a representative standard clinker is as follows:

| Oxides | Special clinker | Standard clinker |
|---|---|---|
|  | Percent | Percent |
| $SiO_2$ | 15.17 | 22.20 |
| $Al_2O_3$ | 8.72 | 6.82 |
| $Fe_2O_3$ | 12.73 | 1.67 |
| $CaO$ | 61.39 | 66.10 |
| $MgO$ | 1.29 | 2.00 |

This special clinker, designed for use as an ingredient in pipe lining cements, is much less soluble than is ordinary clinker and consequently the low solubility of the pipe lining cement of the invention is due to decreasing the percentage of clinker and to the use of a clinker which has a lower solubility than standard clinker.

The present pipe lining cement is manufactured by mixing approximately 85 parts of blast furnace slag with 15 parts of special clinker. A small quantity of gypsum is then added in order to control the set of the final product. The slag and clinker are ground separately to a fineness where approximately 85 to 90 per cent will pass through a 200-mesh sieve. The materials are then mixed in the desired proportions and ground together to a fineness where substantially all will pass through a 200-mesh sieve. This fine grinding of the ingredients produces a stronger cement than would otherwise result. The percentage of slag and special cement clinker stated as preferred is not to be considered as limiting the invention since a satisfactory pipe lining cement can be produced even though the ingredients vary over a wide range.

The calculated approximate compound composition of the special clinker and that of the standard clinker are as follows:

| Compound | Special clinker | Standard clinker |
|---|---|---|
|  | Percent | Percent |
| Tricalcium silicate | 57.7 | 52.1 |
| Dicalcium silicate | 0.0 | 24.4 |
| Tricalcium aluminate | 1.5 | 15.3 |
| Tetracalcium alumino-ferrite | 38.7 | 4.9 |

The calculated heat of hydration, at 28 days, is 89 calories per gram for the special clinker and 119 calories per gram for the standard clinker. The low tricalcium aluminate content of the special clinker places it in the class of sulphate resisting clinkers. This is important because many waters contain appreciable percentages of sulphates.

The low heat of hydration of the special clinker is significant because it means that it has less volume change due to temperature changes, than is the case with the standard clinker. In other words, it belongs to the class of low heat clinkers which favors an unbroken surface of the pipe lining. Of course, the desirable qualities of the special clinker are transmitted to the pipe lining cement.

The following is a typical analysis of blast furnace slag that has been found suitable:

| Oxides | Percent |
| --- | --- |
| $SiO_2$ | 37.93 |
| $Al_2O_3$ | 11.88 |
| $Fe_2O_3$ | 0.87 |
| $CaO$ | 44.15 |
| $MgO$ | 3.21 |

Although a specific example of the invention has been disclosed it is to be distinctly understood that the invention is not limited thereto except as indicated in the appended claims.

What is claimed is:

1. A cement mixture suitable for lining pipes and the like consisting of blast furnace slag, cement clinker characterized by low solubility in water and gypsum, the said cement clinker having approximately the following composition:

| | Per cent |
| --- | --- |
| $SiO_2$ | 15.17 |
| $Al_2O_3$ | 8.72 |
| $Fe_2O_3$ | 12.73 |
| $CaO$ | 61.39 |
| $MgO$ | 1.29 |

2. A cement mixture suitable for lining pipes and the like consisting of approximately 85% blast furnace slag and 15% special cement clinker, said special clinker being characterized by low solubility in water and having approximately the following composition:

| | Per cent |
| --- | --- |
| $SiO_2$ | 15.17 |
| $Al_2O_3$ | 8.72 |
| $Fe_2O_3$ | 12.73 |
| $CaO$ | 61.39 |
| $MgO$ | 1.29 |

JOSHUA C. WITT.